(12) United States Patent
Xue et al.

(10) Patent No.: US 12,116,440 B2
(45) Date of Patent: Oct. 15, 2024

(54) AQUEOUS COMPOSITION COMPRISING MULTI-STAGE LATEX POLYMER PARTICLES

(71) Applicant: Rohm and Haas Company, Collegeville, PA (US)

(72) Inventors: Yin Xue, Shanghai (CN); Zhaohui Qu, Shanghai (CN); Miao Yang, Shanghai (CN)

(73) Assignee: Rohm and Haas Company, Collegeville, PA (US)

( * ) Notice: Subject to any disclaimer, the term of this patent is extended or adjusted under 35 U.S.C. 154(b) by 804 days.

(21) Appl. No.: 17/284,508

(22) PCT Filed: Oct. 10, 2018

(86) PCT No.: PCT/CN2018/109641
§ 371 (c)(1),
(2) Date: Apr. 12, 2021

(87) PCT Pub. No.: WO2020/073229
PCT Pub. Date: Apr. 16, 2020

(65) Prior Publication Data
US 2021/0371568 A1    Dec. 2, 2021

(51) Int. Cl.
| | |
|---|---|
| C08F 267/02 | (2006.01) |
| C08F 2/22 | (2006.01) |
| C08F 212/08 | (2006.01) |
| C08F 212/14 | (2006.01) |
| C08F 220/18 | (2006.01) |
| C08F 220/32 | (2006.01) |
| C08F 222/02 | (2006.01) |
| C08F 279/00 | (2006.01) |
| C08K 5/37 | (2006.01) |
| D06M 15/19 | (2006.01) |
| D06M 15/21 | (2006.01) |

(52) U.S. Cl.
CPC .............. *C08F 267/02* (2013.01); *C08F 2/22* (2013.01); *C08F 279/00* (2013.01); *C08K 5/37* (2013.01); *D06M 15/195* (2013.01); *D06M 15/21* (2013.01); *C08F 212/08* (2013.01); *C08F 212/30* (2020.02); *C08F 220/18* (2013.01); *C08F 220/32* (2013.01); *C08F 222/02* (2013.01); *C08F 2800/20* (2013.01)

(58) Field of Classification Search
CPC ......... C08F 2/22; C08F 212/08; C08F 261/00
See application file for complete search history.

(56) References Cited

U.S. PATENT DOCUMENTS

| | | | |
|---|---|---|---|
| 5,114,991 A | * | 5/1992 | Neubert ................ C08F 257/02 524/451 |
| 6,262,159 B1 | | 7/2001 | Dreher et al. |
| 6,841,608 B1 | | 1/2005 | Dreher et al. |
| 7,638,576 B2 | | 12/2009 | Devonport et al. |
| 9,096,697 B2 | | 8/2015 | Mueller et al. |
| 2005/0043458 A1 | | 2/2005 | Adamo et al. |
| 2008/0154013 A1 | | 6/2008 | Clamen et al. |
| 2013/0248753 A1 | | 9/2013 | Lai et al. |
| 2014/0363385 A1 | | 12/2014 | Zeng et al. |
| 2016/0338940 A1 | | 11/2016 | Zhang et al. |
| 2017/0096575 A1 | | 4/2017 | Cui et al. |
| 2018/0022954 A1 | | 1/2018 | Belowich et al. |
| 2018/0163079 A1 | | 6/2018 | Yang et al. |
| 2018/0371267 A1 | | 12/2018 | Li et al. |
| 2019/0002710 A1 | | 1/2019 | Olesen et al. |

FOREIGN PATENT DOCUMENTS

| | | |
|---|---|---|
| EP | 2085409 A1 | 8/2009 |
| JP | S61-34297 A | 2/1986 |
| JP | 2007-247111 A | 9/2007 |
| JP | 2009-197051 A | 9/2009 |
| WO | WO2012/075245 A1 | 6/2012 |
| WO | 2013/095993 A2 | 6/2013 |
| WO | 2015/192363 A1 | 12/2015 |
| WO | 2017/023830 A1 | 2/2017 |
| WO | 2017/100993 A1 | 6/2017 |

OTHER PUBLICATIONS

JP 2007247111 A machine translation (Sep. 2007).*

* cited by examiner

*Primary Examiner* — Ana L. Woodward
(74) *Attorney, Agent, or Firm* — Boyle Fredrickson, S.C.

(57) ABSTRACT

An aqueous composition including multi-stage latex polymer particles is provided. The multi-stage latex polymer particles include (A) a first-stage polymer containing (i) an ethylenically unsaturated acid monomer with two carboxylic acid groups and (ii) a first vinyl monomer, and (B) a second-stage polymer containing (i) an ethylenically unsaturated monomer with an epoxy group and (ii) a second vinyl monomer. An article including a nonwoven textile impregnated with the aqueous composition is also provided.

12 Claims, No Drawings

AQUEOUS COMPOSITION COMPRISING MULTI-STAGE LATEX POLYMER PARTICLES

BACKGROUND

Aqueous compositions containing latex polymer particles are used as binders for textiles. The latex polymers are traditionally formed with monomers that generate formaldehyde during polymerization, such as methylol acrylamide (MOA) monomer. Formaldehyde is a known carcinogen.

Formaldehyde-free latex polymers have been formed with itaconic acid monomer. However, polymers containing itaconic acid monomer traditionally require the addition of an external crosslinking agent to exhibit sufficient mechanical properties in an article impregnated with the aqueous composition. External crosslinking agents are problematic because external crosslinking agents are difficult to impregnate into textiles, and negatively impact the retention of tensile strength in an article exposed to water or a solvent. Moreover, external crosslinking agents are problematic because external crosslinking agents have a limited pot life.

The art recognizes the need for a formaldehyde-free aqueous composition containing latex polymer particles that is suitable for use as a crosslinkable binder for textiles. The art further recognizes the need for a formaldehyde-free aqueous composition containing latex polymer particles that exhibits an acceptable level of tensile strength retention after exposure to water or a solvent.

SUMMARY

The present disclosure provides an aqueous composition. The aqueous composition includes multi-stage latex polymer particles. The multi-stage latex polymer particles include (A) a first-stage polymer containing (i) an ethylenically unsaturated acid monomer with two carboxylic acid groups and (ii) a first vinyl monomer; and (B) a second-stage polymer containing (i) an ethylenically unsaturated monomer with an epoxy group and (ii) a second vinyl monomer.

The present disclosure also provides an article. The article includes a nonwoven textile impregnated with a coating. The coating includes a composition containing multi-stage latex polymer particles. The multi-stage latex polymer particles include (A) a first-stage polymer containing (i) an ethylenically unsaturated acid monomer with two carboxylic acid groups and (ii) a first vinyl monomer; and (B) a second-stage polymer containing (i) an ethylenically unsaturated monomer with an epoxy group and (ii) a second vinyl monomer.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

"Alkyl" and "alkyl group" refer to a saturated linear, cyclic, or branched hydrocarbon group. Nonlimiting examples of suitable alkyl groups include methyl, ethyl, n-propyl, i-propyl, n-butyl, t-butyl, i-butyl (or 2-methylpropyl), etc. In one embodiment, the alkyl group has from 1 to 20 carbon atoms.

"Alkenyl" or "alkenyl group" refer to a hydrocarbyl group containing at least one C=C double bond. Alkenyl groups may be linear, cyclic or branched. Nonlimiting examples of suitable alkenyl groups include ethenyl groups, n-propenyl groups, i-propenyl groups, n-butenyl groups, t-butenyl groups, i-butenyl groups, etc.

"Aqueous" refers to a composition containing water. An aqueous composition includes from 20 wt %, or 25 wt %, or 30 wt %, or 35 wt %, or 40 wt %, or 45 wt %, or 50 wt %, or 55 wt %, or 60 wt %, or 65 wt %, or 70 wt % to 75 wt %, or 80 wt %, or 85 wt %, or 90 wt %, or 95 wt %, or 99 wt %, or less than 100 wt % water, based on the total weight of the aqueous composition.

"Aralkyl" and "aralkyl group" refer to an organic radical derived from aromatic hydrocarbon by replacing one or more hydrogen atoms with an aryl group.

"Aryl" and "aryl group" refer to an organic radical derived from aromatic hydrocarbon by deleting one hydrogen atom therefrom. An aryl group may be a monocyclic and/or fused ring system, each ring of which suitably contains from 5 to 7, preferably from 5 or 6 atoms. Structures wherein two or more aryl groups are combined through single bond(s) are also included. Specific examples include, but are not limited to, phenyl, tolyl, naphthyl, biphenyl, anthryl, indenyl, fluorenyl, benzofluorenyl, phenanthryl, triphenylenyl, pyrenyl, perylenyl, chrysenyl, naphtacenyl, fluoranthenyl and the like.

"Blend," "polymer blend" and like terms refer to a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method used to measure and/or identify domain configurations.

"Carboxylic acid moiety" and "carboxylic acid group" refer to substituents containing a —COOH group.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Crosslinkable" and "curable" indicate that the polymer, before or after shaped into an article, is not cured or crosslinked and has not been subjected or exposed to treatment that has induced substantial crosslinking although the polymer comprises additive(s) or functionality that will effectuate substantial crosslinking upon subjection or exposure to such treatment (e.g., exposure to water).

"Crosslinked" and similar terms indicate that the polymer composition, before or after it is shaped into an article, has xylene or decalin extractables of less than or equal to 90 weight percent (i.e., greater than or equal to 10 weight percent gel content).

"Epoxy moiety" and "epoxy group" refer to a substituent having the following Structure (A):

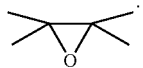

Structure (A)

"Fabric" is a woven structure or a non-woven (such as knitted) structure formed from individual fibers or yarn.

"Fiber" and like terms refer to an elongated column of entangled filaments. Fiber diameter can be measured and reported in a variety of fashions. Generally, fiber diameter is measured in denier per filament. Denier is a textile term which is defined as the grams of the fiber per 9,000 meters of that fiber's length. Monofilament generally refers to an extruded strand having a denier per filament greater than 15, usually greater than 30. Fine denier fiber generally refers to fiber having a denier of 15 or less. Microdenier (aka microfiber) generally refers to fiber having a diameter not greater than 100 micrometers.

"Filament" and like terms refer to a single, continuous strand of elongated material having generally round cross-section and a length to diameter ratio of greater than 10.

A "halogen" is an element in IUPAC Group 17 of the Periodic Table of Elements, which includes fluorine (F), chlorine (CI), bromine (Br), iodine (1), and astatine (At).

A "heteroatom" is an atom other than carbon or hydrogen. The heteroatom can be a non-carbon atom from Groups IV, V, VI and VII of the Periodic Table. Nonlimiting examples of heteroatoms include: halogens, N, O, P, B, S, and Si.

The terms "hydrocarbyl" and "hydrocarbon" refer to substituents containing only hydrogen and carbon atoms, including branched or unbranched, saturated or unsaturated, cyclic, polycyclic or noncyclic species. Nonlimiting examples of a hydrocarbyl group include alkyl-, cycloalkyl-, alkenyl-, alkadienyl-, cycloalkenyl-, cycloalkadienyl-, aryl-, aralkyl-, and alkynyl-groups.

"Ionic" refers to monomers for which the copolymerized monomer residue thereof has an ionic charge at a pH from 1 to 14.

A "knitted fabric" is formed from intertwining yarn or fibers in a series of connected loops either by hand, with knitting needles, or on a machine. The fabric may be formed by warp or weft knitting, flat knitting, and circular knitting. Nonlimiting examples of suitable warp knits include tricot, raschel powernet, and lacing. Nonlimiting examples of suitable weft knits include circular, flat, and seamless (which is often considered a subset of circular knits).

A "latex polymer" is a polymeric compound prepared by aqueous emulsion polymerization. Latex polymers exist as particles suspended throughout a continuous aqueous medium.

"Non-ionic" refers to monomers for which the copolymerized monomer residue thereof does not have an ionic charge at a pH from 1 to 14.

"Nonwoven" refers to a web or a fabric having a structure of individual fibers or threads which are randomly interlaid, but not in an identifiable manner as is the case of a knitted fabric.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

"Substituted hydrocarbyl" and "substituted hydrocarbon" refer to a hydrocarbyl group that is substituted with one or more non-hydrocarbyl substituent groups. Nonlimiting examples of a non-hydrocarbyl substituent group include a heteroatom, heteroatom-containing moieties, oxygen-containing moieties (e.g., alcohol, acrylate, acrylic acid, aldehyde, carboxylic acid, ester, ether, ketone, and peroxide groups), and nitrogen-containing moieties (e.g., amide, amine, azo, imide, imine, nitrate, nitrile, and nitrite groups).

A "textile" is a flexible material composed of a network of natural fibers, artificial fibers, and combinations thereof. Textile includes fabric and cloth.

"Weight of the polymer" refers to the dry weight of the polymer.

"Woven" refers to a web or a fabric having a structure of individual fibers or threads which are interlaid in a pattern in an identifiable manner. A nonlimiting example of a woven fabric is a knitted fabric.

"Yarn" is a continuous length of twisted or otherwise entangled filaments that can be used in the manufacture of woven or knitted fabrics.

Test Methods $D_{50}$ particle size is measured using a Coulter LS 230 Laser Light Scattering Particle Sizer, available from Coulter Corporation. $D_{50}$ particle size is the particle diameter at which 50% of the MSLPP's mass is composed of particles with a diameter less than this value and 50% of the MSLPP's mass is composed of particles with a diameter greater than said value. Particle size is measured in microns (μm).

The epoxy content is calculated by determining the ratio of the molecular weight of the epoxy groups relative to the molecular weight of the total polymer. Epoxy content is reported as a percentage (% or wt %).

Formaldehyde content. The presence (or absence) of formaldehyde in aqueous compositions or latex polymers is determined in accordance with ASTM D5910-05.

Glass transition temperature (Tg) is measured according to ASTM-D3418-15.

Gel Permeation Chromatography (GPC)

An Agilent 1200 conventional gel permeation chromatography (GPC) system, equipped with Agilent isocratic pump is used for sample analysis. The concentration detector is an Agilent differential refractive index (DRI) detector. Data is acquired and processed using Agilent Chemstation (Version B 02.01-SR1) and Agilent GPC-Add on software (Rev. B 01.01). The carrier solvent is tetrahydrofuran (THF) with formic acid (FA) (volume ratio: 95:5). The system is equipped with an on-line solvent degas device from Agilent. The column compartment is operated at 40° C. The columns are two Mixed B 30 cm, 10 micron columns. The flow rate is 1.0 ml/min, and the injection volume is 100 μl. A "2 mg/m" sample concentration is prepared by dissolving the sample in tetrahydrofuran (THF) with formic acid (FA) (volume ratio: 95:5), overnight. Then, the samples are filtered through a 0.45 μm polytetrafluoroethylene (PTFE) filter prior to the GPC analysis.

The GPC column set is calibrated by running ten narrow molecular weight distribution polystyrene standards. The molecular weight (MW) of the standards range from 162 g/mol to 2,329,000 g/mol, and the standards are contained in three "cocktail" mixtures. Each standard mixture has at least a decade of separation between individual molecular weights.

A logarithmic molecular weight calibration is generated using a third order polynomial fit as a function of elution volume. Number average and weight average molecular weights are calculated according to the following equations:

$$M_n = \frac{\Sigma^i W f_i}{\Sigma^i (W f_i / M_i)}, \quad \text{(Eq 1)}$$

$$M_w = \frac{\Sigma^i (W f_i * M_i)}{\Sigma^i (W f_i)}, \quad \text{(Eq 2)}$$

where $Wf_i$ and $M_i$ are the weight fraction and molecular weight of elution component i, respectively.

Tensile Strength

Dry tensile strength, wet tensile strength, and isopropyl alcohol (IPA) tensile strength each is measured on an Instron 5943.

Each sample is diluted with deionized (DI) water to have a solids content of 12 wt %, based on the total weight of the aqueous composition. A substrate is provided that is a piece of WHATMAN™ Grade 4 cellulose filter paper (available from Whatman Ltd.) that is 28 cm×46 cm. The substrate is (i) immersed in 300 mL of the diluted sample for a period of 30 seconds, (ii) removed from the diluted sample, (iii) padded by a Mathis™ padder, and (iv) dried and crosslinked in an oven at a temperature of 150° C. for 3 minutes to form a crosslinked article. The add-on of the polymer particles is controlled to be from 15 wt % to 17 wt % of the total crosslinked article.

The crosslinked article is cut into 1 inch×4 inch test strips, wherein the 4-inch direction is the cross-machine direction (CD) of the test strip.

The tensile strength of the test strips are measured on an Instron 5943 under three conditions: dry, wet, and IPA. The "dry" condition is measured on a test strip that has not been treated post-cutting. A "wet" condition is measured immediately after a test strip is immersed for 30 minutes in a solution containing 0.1 wt % TRITON™ X-100 (octylphenol ethoxylate, a surfactant available from The Dow Chemical Company). The wet tensile strength indicates the resistance of a crosslinked article to water. An "IPA" condition is measured immediately after a test strip is immersed for 30 minutes in isopropyl alcohol (IPA). The IPA tensile strength indicates the resistance of a crosslinked article to IPA.

The gap between the two clamps of the Instron 5943 is preset to 50 mm before testing. The speed of the Instron 5943 is preset to 300 mm per minute (mm/min). The maximum tensile strength is recorded for each test strip, and the average of nine samples is recorded.

Tensile strength is measured in kilogram-force per inch (kgf/in).

Tensile Strength Retention

Wet tensile retention is calculated in accordance with Equation (A):

$$\text{Wet Tensile Retention (\%)} = \frac{\text{wet tensile strength}}{\text{dry tensile strength}} \times 100. \quad \text{Equation (A)}$$

IPA tensile retention is calculated in accordance with Equation (B):

$$\text{IPA Tensile Retention (\%)} = \frac{\text{IPA tensile strength}}{\text{dry tensile strength}} \times 100. \quad \text{Equation (B)}$$

DETAILED DESCRIPTION

The present disclosure provides an aqueous composition. The aqueous composition includes multi-stage latex polymer particles. The multi-stage latex polymer particles include (A) a first-stage polymer containing (i) an ethylenically unsaturated acid monomer with two carboxylic acid groups and (ii) a first vinyl monomer; and (B) a second-stage polymer containing (i) an ethylenically unsaturated monomer with an epoxy group and (ii) a second vinyl monomer.

A "multi-stage latex polymer particle" ("MSLPP") is a latex polymer in which the particles include a first-stage polymer and a second-stage polymer, with the first-stage polymer bound to the second-stage polymer. The MSLPP is prepared in two or more polymerization stages. In one of the stages, an emulsion polymerization process is conducted to produce first-stage polymer particles. In a subsequent stage, an emulsion polymerization process is conducted in the presence of the first-stage polymer particles to form the second-stage polymer. One or more additional polymerization stages are optionally conducted (i) before the formation of the first-stage polymer; and/or (ii) between the formation of the first-stage polymer and the second-stage polymer; and/or (iii) after the formation of the second-stage polymer; and/or (iv) a combination thereof.

In an embodiment, a period of time exists between the formation of the first-stage polymer and the formation of the second-stage polymer in which no detectable polymerization takes place.

In the formation of the second-stage polymer, half or more of the second-stage polymer (by weight, based on the weight of the second-stage polymer) forms on the surfaces of the first-stage polymer particles, and the second-stage polymer binds to the first-stage polymer. The second-stage polymer encapsulates, or substantially encapsulates, the first-stage polymer particles.

A. First-Stage Polymer

The present multi-stage latex polymer particles include (A) a first-stage polymer containing (i) an ethylenically unsaturated acid monomer with two carboxylic acid groups and (ii) a first vinyl monomer.

(i) Ethylenically Unsaturated Acid Monomer with Two Carboxylic Acid Groups

The first-stage polymer includes an ethylenically unsaturated acid monomer with two carboxylic acid groups (COOH-EUAM).

An "ethylenically unsaturated acid monomer with two carboxylic acid groups" ("COOH-EUAM") is a compound having the following Structure (1):

Structure (1)

wherein $R^1$, $R^2$, $R^3$, and $R^4$ each is independently selected from hydrogen, a halogen, a hydrocarbyl, a substituted hydrocarbyl, and combinations thereof, with the proviso that two substituents of $R^1$, $R^2$, $R^3$, and $R^4$ include a carboxylic acid group.

In an embodiment, two substituents, and only two substituents, of $R^1$, $R^2$, $R^3$, and $R^4$ include a carboxylic acid group in Structure (1).

A nonlimiting example of a suitable COOH-EUAM is itaconic acid (IA). Itaconic acid has the following Structure (1A):

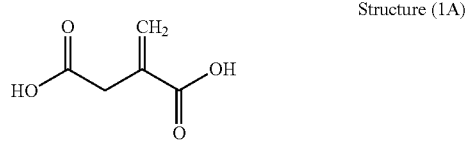

Structure (1A)

The COOH-EUAM excludes ethylenically unsaturated acid monomers with a single carboxylic acid group, such as acrylic acid.

The COOH-EUAM may comprise two or more embodiments disclosed herein.

(ii) First Vinyl Monomer

The first-stage polymer includes a first vinyl monomer.

A "vinyl monomer" is a compound having the following Structure (2):

Structure (2)

wherein $R^5$, $R^6$, $R^7$, and $R^8$ each is independently selected from hydrogen, a halogen, a hydrocarbyl, a substituted hydrocarbyl, and combinations thereof, with the proviso that no more than one substituent of $R^5$, $R^6$, $R^7$, and $R^8$ includes a carboxylic acid group.

The vinyl monomer is different than the COOH-EUAM because the vinyl monomer includes no more than one carboxylic acid group, while the COOH-EUAM requires two carboxylic acid groups. In an embodiment, the vinyl monomer excludes carboxylic acid groups.

Nonlimiting examples of suitable vinyl monomers include styrene (STY), α-methyl styrene, vinyl acetate, vinyl neodecanoate, acrylonitrile (AN), methacrylic acid (MAA), acrylic acid (AA), methacrylamides, acrylamides, butyl acrylate (BA), ethyl acrylate (EA), methyl methacrylate (MMA), allylmethacrylate (ALMA), divinylbenzene (DVB), hydroxy ethyl methacrylate (HEMA), 2-ethyl hexyl acrylate (EHA), diallyl phthalate, 1,4-butylene glycol dimethacrylate, 1,2-ethylene glycol dimethacrylate, 1,6-hexanediol diacrylate, and combinations thereof.

In an embodiment, the first vinyl monomer is selected from BA, EA, STY, HEMA, EHA, AA, MMA, MAA, AN, and combinations thereof.

In an embodiment, the first vinyl monomer is selected from BA, EA, STY, HEMA, EHA, AA, and combinations thereof.

In an embodiment, the first vinyl monomer is non-ionic.

The first vinyl monomer may comprise two or more embodiments disclosed herein.

In an embodiment, the first-stage polymer contains, consists essentially of, or consists of: (i) COOH-EUAM; and (ii) a first vinyl monomer selected from BA, EA, STY, HEMA, EHA, AA, AN, MMA, MAA, and combinations thereof.

In an embodiment, the first-stage polymer contains, consists essentially of, or consists of: (i) COOH-EUAM; and (ii) a first vinyl monomer selected from BA, EA, STY, HEMA, EHA, AA, and combinations thereof.

In an embodiment, the first-stage polymer contains from 1.0 wt %, or 1.5 wt %, or 2.0 wt %, or 2.5 wt % to 5.0 wt %, or 5.5 wt %, or 6.0 wt %, or 7.0 wt %, or 8.0 wt %, or 9.0 wt %, or 10.0 wt % polymerized units of COOH-EUAM, based on the dry weight of the first-stage polymer. In an embodiment, the first-stage polymer contains from 1.0 wt % to 10.0 wt %, or from 1.0 wt % to 5.0 wt % polymerized units of COOH-EUAM, based on the dry weight of the first-stage polymer.

In an embodiment, the first-stage polymer contains (i) from 1.0 wt %, or 1.5 wt %, or 2.0 wt %, or 2.5 wt % to 5.0 wt %, or 5.5 wt %, or 6.0 wt %, or 7.0 wt %, or 8.0 wt %, or 9.0 wt %, or 10.0 wt % COOH-EUAM; and (ii) a reciprocal amount of the first vinyl monomer, or from 90 wt %, 91 wt %, or 92 wt %, or 93 wt %, or 94 wt %, or 95 wt % to 97.5 wt %, or 98 wt %, or 98.5 wt %, 99 wt % first vinyl monomer, based on the dry weight of the first-stage polymer.

In an embodiment, the first-stage polymer contains, consists essentially of, or consists of IA, BA, STY, and AA. In a further embodiment, the first-stage polymer includes, based on the dry weight of the first-stage polymer: (i) from 1.0 wt %, or 1.5 wt %, or 2.0 wt %, or 2.5 wt % to 3.0 wt %, or 3.5 wt %, or 4.0 wt %, or 5.0 wt % IA; (ii) from 70 wt %, or 75 wt %, or 80 wt %, or 81 wt % to 82 wt %, or 85 wt %, or 90 wt % BA; (iii) from 5 wt %, or 10 wt %, or 12 wt %, or 14 wt % to 15 wt %, or 18 wt %, or 20 wt % STY; and (iv) from 0.5 wt % or 1.0 wt %, or 1.5 wt %, or 2.0 wt % to 2.5 wt %, or 3.0 wt %, or 4.0 wt %, or 5.0 wt % AA.

In an embodiment, the first-stage polymer contains, consists essentially of, or consists of IA, BA, EA, and HEMA. In a further embodiment, the first-stage polymer includes, based on the dry weight of the first-stage polymer: (i) from 1.0 wt %, 2.0 wt %, 3.0 wt %, or 3.5 wt %, or 4.0 wt %, or 4.5 wt % to 5.0 wt %, or 5.5 wt %, or 6.0 wt %, or 6.5 wt %, or 7.0 wt % IA; (ii) from 45 wt %, or 50 wt %, or 55 wt %, or 60 wt %, or 64 wt % to 65 wt %, or 70 wt %, or 75 wt %, or 80 wt % BA; (iii) from 15 wt %, or 20 wt %, or 25 wt %, or 30 wt % to 35 wt %, or 40 wt %, or 45 wt % EA; and (iv) from 0.1 wt %, or 0.2 wt %, or 0.3 wt %, or 0.4 wt %, or 0.5 wt % to 0.6 wt %, or 0.7 wt %, or 0.8 wt %, or 0.9 wt %, or 1.0 wt %, or 1.5 wt %, or 2.0 wt %, or 5.0 wt % HEMA.

In an embodiment, the first-stage polymer contains, consists essentially of, or consists of IA, EA, and EHA. In a further embodiment, the first-stage polymer includes, based on the dry weight of the first-stage polymer: (i) from 1.0 wt %, 2.0 wt %, 3.0 wt %, or 3.5 wt %, or 4.0 wt %, or 4.5 wt % to 5.0 wt %, or 5.5 wt %, or 6.0 wt %, or 6.5 wt %, or 7.0 wt % IA; (ii) from 50 wt %, or 55 wt %, or 60 wt %, or 65 wt %, or 70 wt %, or 75 wt % to 80 wt %, or 85 wt %, or 90 wt % EA; and (iii) from 9 wt %, or 10 wt %, or 15 wt %, or 17 wt %, or 20 wt % to 22 wt %, or 25 wt %, or 30 wt %, or 35 wt %, or 40 wt %, or 45 wt %, or 49 wt % EHA.

It is understood that the aggregate of components (i)-(iv) amount to 100 wt % of the first-stage polymer.

In an embodiment, the first-stage polymer is void of, or substantially void of, an ethylenically unsaturated monomer with an epoxy group (Epoxy-EUM).

The first-stage polymer may comprise two or more embodiments disclosed herein.

B. Second-Stage Polymer

The present multi-stage latex polymer particles include (B) a second-stage polymer containing (i) an ethylenically unsaturated monomer with an epoxy group; (ii) a second vinyl monomer; and (iii) optionally, an additive.

(i) Ethylenically Unsaturated Monomer with an Epoxy Group

The second-stage polymer includes an ethylenically unsaturated monomer with an epoxy group (Epoxy-EUM).

An "ethylenically unsaturated monomer with an epoxy group" ("Epoxy-EUM") is a compound having the following Structure (3):

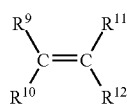

Structure (3)

wherein $R^9$, $R^{10}$, $R^{11}$, and $R^{12}$ each is independently selected from hydrogen, a halogen, a hydrocarbyl, a substituted hydrocarbyl, and combinations thereof, with the proviso that at least one substituent of $R^9$, $R^{10}$, $R^{11}$, and $R^{12}$ includes an epoxy group.

In an embodiment, from 1 to 2, or 3 substituents of $R^9$, $R^{10}$, $R^{11}$, and $R^{12}$ includes an epoxy group in Structure (3). In another embodiment, one, and only one, substituent, of $R^9$, $R^{10}$, $R^{11}$, and $R^{12}$ includes an epoxy group in Structure (3).

A nonlimiting example of a suitable Epoxy-EUM is glycidyl methacrylate (GMA). GMA has the following Structure (3A):

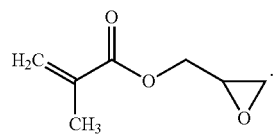

Structure (3A)

The Epoxy-EUM may comprise two or more embodiments disclosed herein (ii) Second Vinyl Monomer The second-stage polymer includes a second vinyl monomer.

The second vinyl monomer may be any vinyl monomer disclosed herein.

The second vinyl monomer may be the same as or different than the first vinyl monomer in the first-stage polymer. In an embodiment, the second vinyl monomer of the second-stage polymer is the same as the first vinyl monomer of the first-stage polymer. When the second vinyl monomer of the second-stage polymer is the same as the first vinyl monomer of the first-stage polymer, the second vinyl monomer and the first vinyl monomer include an identical vinyl monomer, or an identical blend of vinyl monomers in an identical weight ratio. In another embodiment, the second vinyl monomer of the second-stage polymer is different than the first vinyl monomer of the first-stage polymer.

The second vinyl monomer may comprise two or more embodiments disclosed herein.

(iii) Optional Additive

In an embodiment, the second-phase polymer includes an optional additive. Nonlimiting examples of suitable additives include chain transfer agents, ionic monomer, and combinations thereof.

A "chain transfer agent" ("CTA") is used to control the molecular weight in a polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. These agents can be of many different types, from saturated hydrocarbons or unsaturated hydrocarbons to aldehydes, ketones or alcohols. By controlling the concentration of the selected chain transfer agent, one can control the length of polymer chains, and, hence, the molecular weight. "Chain transfer agent system" or "CTA system" includes a single CTA or a mixture of CTAs. A CTA system includes a component able to transfer a hydrogen atom to a growing polymer molecule containing a radical by which the radical is transferred to the CTA molecule, which can then initiate the start of a new polymer chain.

A nonlimiting example of a suitable CTA is methyl mercaptopropionate (MMP).

In an embodiment, the second-phase polymer includes a residual amount of CTA (e.g., MMP). In another embodiment, the second-phase polymer contains from greater than 0 wt %, or 0.01 wt %, or 0.05 wt %, or 0.1 wt %, or 0.2 wt %, or 0.3 wt %, or 0.4 wt %, or 0.5 wt % to 0.6 wt %, or 0.7 wt %, or 0.8 wt %, or 0.9 wt %, or 1.0 wt %, or 5.0 wt % CTA, based on the dry weight of the second-phase polymer. In another embodiment, the second-phase polymer contains from 0.01 wt % to 5.0 wt %, or from 0.1 wt % to 1.0 wt %, or from 0.2 wt % to 0.8 wt % CTA, based on the dry weight of the second-phase polymer.

In an embodiment, the second-phase polymer includes an ionic monomer. A nonlimiting example of a suitable ionic monomer is sodium styrene sulfonate (SSS). Not wishing to be bound by any particular theory, it is believed that the ionic monomer provides the aqueous composition with improved stability.

In an embodiment, the second-phase polymer contains from greater than 0 wt %, or 0.01 wt %, or 0.05 wt %, or 0.1 wt %, or 0.2 wt %, or 0.3 wt %, or 0.4 wt %, or 0.5 wt % to 0.6 wt %, or 0.7 wt %, or 0.8 wt %, or 0.9 wt %, or 1.0 wt %, or 5.0 wt % SSS, based on the dry weight of the second-phase polymer. In another embodiment, the second-phase polymer contains from 0.01 wt % to 5.0 wt %, or from 0.1 wt % to 1.0 wt %, or from 0.2 wt % to 0.8 wt % SSS, based on the dry weight of the second-phase polymer.

The optional additive may comprise two or more embodiments disclosed herein.

In an embodiment, the second-phase polymer has a weight average molecular weight (Mw) from 10,000 g/mol to 500,000 g/mol, or from 10,000 g/mol to 400,000 g/mol. In another embodiment, the second-phase polymer has a Mw from 10,000 g/mol, or 12,000 g/mol, or 15,000 g/mol, or 17,000 g/mol, or 20,000 g/mol to 100,000 g/mol, or 150,000 g/mol, or 200,000 g/mol, or 250,000 g/mol, or 300,000 g/mol, or 350,000 g/mol, or 400,000 g/mol, or 500,000 g/mol. In a further embodiment, the second-phase polymer as a Mw from 10,000 g/mol to 300,000 g/mol, or from 15,000 g/mol to 250,000 g/mol, or from 20,000 g/mol to 200,000 g/mol.

In an embodiment, the second-stage polymer contains, consists essentially of, or consists of polymerized units derived from (i) Epoxy-EUM and (ii) the second vinyl monomer selected from BA, EA, STY, HEMA, EHA, AA, AN, MAA, MMA, and combinations thereof.

In an embodiment, the second-stage polymer contains, consists essentially of, or consists of polymerized units derived from (i) Epoxy-EUM and (ii) the second vinyl monomer selected from BA, EA, STY, HEMA, EHA, AA, and combinations thereof.

In an embodiment, the second-stage polymer contains from 25 wt %, or 30 wt %, or 35 wt %, or 40 wt %, or 45 wt % to 50 wt %, or 55 wt %, or 60 wt %, or 65 wt %, or 70 wt %, or 75 wt % polymerized units of Epoxy-EUM, based on the dry weight of the second-stage polymer. In another embodiment, the second-stage polymer contains from 25 wt % to 75 wt %, or from 40 wt % to 60 wt % polymerized units of Epoxy-EUM, based on the dry weight of the second-stage polymer.

In an embodiment, the second-stage polymer contains (i) from 25 wt %, or 30 wt %, or 35 wt %, or 40 wt %, or 45 wt % to 50 wt %, or 55 wt %, or 60 wt %, or 65 wt %, or 70 wt %, or 75 wt % Epoxy-EUM; and (ii) a reciprocal amount of the second vinyl monomer, or from 25 wt %, or 30 wt %, or 35 wt %, or 40 wt %, or 45 wt % to 50 wt %, or 55 wt %, or 60 wt %, or 65 wt %, or 70 wt %, or 75 wt % second vinyl monomer, based on the dry weight of the second-stage polymer.

In an embodiment, the second-stage polymer contains (i) from 25 wt %, or 30 wt %, or 35 wt %, or 40 wt %, or 45 wt % to 50 wt %, or 55 wt %, or 60 wt %, or 65 wt %, or 70 wt %, or 75 wt % Epoxy-EUM; (ii) from 25 wt %, or 30 wt %, or 35 wt %, or 40 wt %, or 45 wt % to 50 wt %, or 55 wt %, or 60 wt %, or 65 wt %, or 70 wt %, or 75 wt % second vinyl monomer; and (iii) from greater than 0 wt %, or 0.01 wt %, or 0.05 wt %, or 0.1 wt %, or 0.2 wt %, or 0.3 wt %, or 0.4 wt %, or 0.5 wt % to 0.6 wt %, or 0.7 wt %, or 0.8 wt %, or 0.9 wt %, or 1.0 wt %, or 5.0 wt % additive, such as MMP and/or SSS, based on the dry weight of the second-stage polymer.

In an embodiment, the second-stage polymer contains, consists essentially of, or consists of GMA, BA, and AA. In a further embodiment, the second-stage polymer includes, based on the dry weight of the second-stage polymer: (i) from 35 wt %, or 40 wt %, or 45 wt % to 50 wt %, or 55 wt %, or 60 wt % GMA; (ii) from 30 wt %, or 35 wt %, or 40 wt % to 45 wt %, or 50 wt %, or 55 wt % BA; and (iii) from 1 wt %, or 2 wt %, or 3 wt %, or 4 wt %, or 5 wt % to 6 wt %, or 7 wt %, or 8 wt %, or 9 wt %, or 10 wt % AA. The second-phase polymer has a Mw from 10,000 g/mol, or 12,000 g/mol, or 15,000 g/mol, or 17,000 g/mol, or 20,000 g/mol to 100,000 g/mol, or 150,000 g/mol, or 200,000 g/mol, or 250,000 g/mol, or 300,000 g/mol, or 400,000 g/mol.

In an embodiment, the second-stage polymer contains, consists essentially of, or consists of GMA, BA, AA, and MMP. Ina further embodiment, the second-stage polymer includes, based on the dry weight of the second-stage polymer: (i) from 30 wt %, or 35 wt %, or 40 wt %, or 45 wt % to 50 wt %, or 55 wt %, or 60 wt % GMA; (ii) from 30 wt %, or 35 wt %, or 40 wt % to 45 wt %, or 50 wt %, or 55 wt % BA; (iii) from 1 wt %, or 2 wt %, or 3 wt %, or 4 wt %, or 5 wt % to 6 wt %, or 7 wt %, or 8 wt %, or 9 wt %, or 10 wt % AA; and (iv)) from greater than 0 wt %, or 0.01 wt %, or 0.05 wt %, or 0.1 wt %, or 0.2 wt %, or 0.3 wt %, or 0.4 wt %, or 0.5 wt % to 0.6 wt %, or 0.7 wt %, or 0.8 wt %, or 0.9 wt %, or 1.0 wt %, or 5.0 wt % MMP. The second-phase polymer has a Mw from 10,000 g/mol, or 12,000 g/mol, or 15,000 g/mol, or 17,000 g/mol, or 20,000 g/mol to 25,000 g/mol, or 30,000 g/mol, or 35,000 g/mol, or 40,000 g/mol.

In an embodiment, the second-stage polymer contains, consists essentially of, or consists of GMA, STY, and SSS. In a further embodiment, the second-stage polymer includes, based on the dry weight of the second-stage polymer: (i) from 30 wt %, or 35 wt %, or 40 wt %, or 45 wt % to 50 wt %, or 55 wt %, or 60 wt % GMA; (ii) from 30 wt %, or 35 wt %, or 40 wt %, or 45 wt % to 50 wt %, or 55 wt %, or 60 wt % STY; and (iii) from greater than 0 wt %, or 0.01 wt %, or 0.05 wt %, or 0.1 wt %, or 0.2 wt %, or 0.3 wt %, or 0.4 wt %, or 0.5 wt % to 0.6 wt %, or 0.7 wt %, or 0.8 wt %, or 0.9 wt %, or 1.0 wt %, or 5.0 wt % SSS. The second-phase polymer has a Mw from 10,000 g/mol, or 12,000 g/mol, or 15,000 g/mol, or 17,000 g/mol, or 20,000 g/mol to 100,000 g/mol, or 150,000 g/mol, or 200,000 g/mol, or 250,000 g/mol, or 300,000 g/mol, or 350,000 g/mol, or 400,000 g/mol.

In an embodiment, the second-stage polymer contains, consists essentially of, or consists of GMA, EHA, and SSS. In a further embodiment, the second-stage polymer includes, based on the dry weight of the second-stage polymer: (i) from 30 wt %, or 35 wt %, or 40 wt %, or 45 wt % to 50 wt %, or 55 wt %, or 60 wt % GMA; (ii) from 30 wt %, or 35 wt %, or 40 wt %, or 45 wt % to 50 wt %, or 55 wt %, or 60 wt % EHA; and (iii) from greater than 0 wt %, or 0.01 wt %, or 0.05 wt %, or 0.1 wt %, or 0.2 wt %, or 0.3 wt %, or 0.4 wt %, or 0.5 wt % to 0.6 wt %, or 0.7 wt %, or 0.8 wt %, or 0.9 wt %, or 1.0 wt %, or 5.0 wt % SSS. The second-phase polymer has a Mw from 10,000 g/mol, or 12,000 g/mol, or 15,000 g/mol, or 17,000 g/mol, or 20,000 g/mol to 100,000 g/mol, or 150,000 g/mol, or 200,000 g/mol, or 250,000 g/mol, or 300,000 g/mol, or 350,000 g/mol, or 400,000 g/mol.

The aggregate of components (i)-(iv) amount to 100 wt % of the second-stage polymer.

In an embodiment, the second-stage polymer is void of, or substantially void of, COOH-EUAM.

The second-stage polymer may comprise two or more embodiments disclosed herein.

The first-stage polymer is bound to the second-stage polymer. In an embodiment, the first-stage polymer is bound to the second-stage polymer by a crosslinking reaction between at least one monomer in the first-stage polymer and at least one monomer in the second-stage polymer.

In an embodiment, the MSLPP includes from 50 wt %, or 55 wt %, or 60 wt %, or 65 wt %, or 70 wt %, or 75 wt %, or 80 wt %, or 85 wt %, or 90 wt % to 95 wt %, or 99 wt % of the first-stage polymer, based on the total dry weight of the MSLPP. In an embodiment, the MSLPP includes from 80 wt % to 99 wt %, or from 85 wt % to 95 wt %, or from 90 wt % to 95 wt % of the first-stage polymer, based on the total dry weight of the MSLPP In an embodiment, the MSLPP includes from 1 wt %, or 2 wt %, or 5 wt % to 10 wt %, or 15 wt %, or 20 wt %, or 25 wt %, or 30 wt %, or 35 wt %, or 40 wt %, or 45 wt %, or 50 wt % of the second-stage polymer, based on the total dry weight of the MSLPP. In another embodiment, the MSLPP includes from 1 wt % to 20 wt %, or from 1 wt % to 15 wt %, or from 5 wt % to 10 wt % of the second-stage polymer, based on the total dry weight of the MSLPP.

In an embodiment, the weight ratio of the first-stage polymer to the second-stage polymer in the MSLPP is from 1:1, or 4:1, or 5:1, or 9:1 to 19:1, or 20:1, or 50:1, or 75:1, or 99:1. In another embodiment, the weight ratio of the first-stage polymer to the second-stage polymer in the MSLPP is from 1:1 to 99:1, or from 4:1 to 99:1, or from 9:1 to 19:1.

In an embodiment, the MSLPP has an epoxy content from 0.50%, or 0.75% to 1.5%, or 2.0%, or 3.0%, or 4.0%, or 5.0%, based on total molecular weight of the MSLPP. In a further embodiment, the MSLPP has an epoxy content from 0.50% to 5.0%, or from 0.50% to 2.0%, or from 0.75% to 1.5%, based on total molecular weight of the MSLPP.

In an embodiment, the MSLPP has a $D_{50}$ particle size from 0.03 μm, or 0.05 μm, or 0.1 μm, or 0.5 μm, or 1.0 μm to 5 μm, or 10 μm, or 15 μm, or 20 μm.

In an embodiment, the MSLPP is void of, or substantially void of, formaldehyde-generating monomers. A "formaldehyde-generating monomer" is a compound the produces formaldehyde during polymerization and/or crosslinking reactions. A nonlimiting example of a formaldehyde-generating monomer is methylol acrylamide (MOA) monomer.

The present MSLPP with (A) a first-stage polymer and (B) a second-stage polymer excludes single-phase polymers, such as polymers prepared in a single polymerization step. Instead, the present MSLPP is structurally distinct from traditional single-phase polymers because the present MSLPP includes two distinct polymers with different monomers (the (A) first-stage polymer containing COOH-EUAM and a first vinyl monomer, and the (B) second-stage polymer containing Epoxy-EUM and a second vinyl monomer) bound together, while traditional single-phase polymers include a single polymer with the same monomers distributed throughout the entire polymer chain.

The MSLPP may comprise two or more embodiments disclosed herein.

D. Aqueous Composition

The present aqueous composition incudes MSLPP. The MSLPP may be any MSLPP disclosed herein.

In an embodiment, the aqueous composition contains one or more optional composition additives. Nonlimiting examples of suitable composition additives include wetting agents, rheology modifiers (such as ACRYSOL™ ASE-60, a thickening agent, available from The Dow Chemical Company), antiblocking agents, defoamers, atomizing aids, bases (such as aqueous ammonia hydroxide), pigments, dyes, fillers (such as titanium dioxide ($TiO_2$) and calcium carbonate ($CaCO_3$)), wax, and combinations thereof. In an embodiment, the aqueous composition contains from greater than 0 wt %, or 0.1 wt %, or 0.5 wt % to 1 wt %, or 5 wt %, or 10 wt %, or 20 wt %, or 30 wt %, or 40 wt %, or 50 wt % optional composition additive, based on the total weight of the aqueous composition. In an embodiment, the aqueous composition contains from greater than 0 wt % to 10 wt %, or from 0.1 wt % to 10 wt % optional composition additive, based on the total weight of the aqueous composition.

In an embodiment, the aqueous composition has a solids content from 1 wt %, or 5 wt %, or 10 wt %, or 15 wt %, or 20 wt %, or 25 wt %, or 30 wt %, or 35 wt %, or 40 wt %, or 45 wt %, to 50 wt %, or 55 wt %, or 60 wt %, or 70 wt %, or 80 wt %, based on the total weight of the aqueous composition. In another embodiment, the aqueous composition has a solids content from 30 wt % to 80 wt %, or from 40 wt % to 50 wt % based on the total weight of the aqueous composition In an embodiment, the aqueous composition contains from 1 wt %, or 5 wt %, or 10 wt %, or 15 wt %, or 20 wt %, or 25 wt %, or 30 wt %, or 35 wt %, or 40 wt %, or 45 wt %, to 50 wt %, or 55 wt %, or 60 wt %, or 70 wt %, or 80 wt % MSLPP, based on the total weight of the aqueous composition. In another embodiment, the aqueous composition contains from 30 wt % to 80 wt %, or from 40 wt % to 50 wt % MSLPP, based on the total weight of the aqueous composition.

In an embodiment, the aqueous composition is stable. Stability is determined by measuring viscosity before and after storage. If the ratio of the viscosity after storage to the viscosity before storage remains in the range of from 0.5:1 to 2:1, the aqueous composition is considered stable. Viscosity is measured at 25° C., with a Brookfield LV viscometer, spindle #2, at 60 rpm. Storage is conducted at SOT for 7 days.

In an embodiment, the aqueous composition is void of, or substantially void of, formaldehyde.

In an embodiment, the aqueous composition is void of, or substantially void of, an external crosslinking agent. An "external crosslinking agent" is a crosslinking agent that is free in the aqueous composition. In other words, an external crosslinking agent is a compound that is not part of the polymeric backbone of either the first-stage polymer or the second-stage polymer. Nonlimiting examples of external crosslinking agents include triethanolamine (TEA), polyisocyanates, and epoxies.

In an embodiment, the aqueous composition contains, consists essentially of, or consists of MSLPP containing, consisting essentially of, or consisting of:

(A) from 50 wt %, or 55 wt %, or 60 wt %, or 65 wt %, or 70 wt %, or 75 wt %, or 80 wt %, or 85 wt %, or 90 wt % to 95 wt %, or 99 wt % first-stage polymer, based on the total weight of the MSLPP, the first-stage polymer containing (i) from 1.0 wt %, or 1.5 wt %, or 2.0 wt %, or 2.5 wt % to 5.0 wt %, or 5.5 wt %, or 6.0 wt %, or 7.0 wt %, or 8.0 wt %, or 9.0 wt %, or 10.0 wt % % polymerized units of COOH-EUAM, based on the dry weight of the first-stage polymer; and (ii) from 90 wt %, 91 wt %, or 92 wt %, or 93 wt %, or 94 wt %, or 95 wt % to 97.5 wt %, or 98 wt %, or 98.5 wt %, 99 wt % polymerized units of a first vinyl monomer, based on the dry weight of the first-stage polymer;

(B) from 1 wt %, or 2 wt %, or 5 wt % to 10 wt %, or 15 wt %, or 20 wt %, or 25 wt %, or 30 wt %, or 35 wt %, or 40 wt %, or 45 wt %, or 50 wt % second-stage polymer, based on the total weight of the MSLPP, the second-stage polymer containing (i) from 25 wt %, or 30 wt %, or 35 wt %, or 40 wt %, or 45 wt % to 50 wt %, or 55 wt %, or 60 wt %, or 65 wt %, or 70 wt %, or 75 wt % polymerized units of Epoxy-EUM, based on the dry weight of the second-stage polymer; (ii) from 25 wt %, or 30 wt %, or 35 wt %, or 40 wt %, or 45 wt % to 50 wt %, or 55 wt %, or 60 wt %, or 65 wt %, or 70 wt %, or 75 wt % polymerized units of second vinyl monomer, based on the dry weight of the second-stage polymer; and (iii) from greater than 0 wt %, or 0.01 wt %, or 0.05 wt %, or 0.1 wt %, or 0.2 wt %, or 0.3 wt %, or 0.4 wt %, or 0.5 wt % to 0.6 wt %, or 0.7 wt %, or 0.8 wt %, or 0.9 wt %, or 1.0 wt %, or 5.0 wt % additive, based on the dry weight of the second-stage polymer;

the second-stage polymer has a Mw from 10,000 g/mol, or 12,000 g/mol, or 15,000 g/mol, or 17,000 g/mol, or 20,000 g/mol to 100,000 g/mol, or 150,000 g/mol, or 200,000 g/mol, or 250,000 g/mol, or 300,000 g/mol, or 350,000 g/mol, or 400,000 g/mol, or 500,000 g/mol;

the first-stage polymer is bound to the second-stage polymer; and the MSLPP has one, some, or all, of the following properties: (1) the first-stage polymer is void of, or substantially void of, Epoxy-EUM; and/or (2) the second-stage polymer is void of, or substantially void of, COOH-EUAM; and/or (3) the weight ratio of the first-stage polymer to the second-stage polymer in the MSLPP is from 1:1, or 4:1, or 5:1, or 9:1 to 19:1, or 20:1, or 50:1, or 75:1, or 99:1; and/or (4) the MSLPP has a $D_{50}$ particle size from 0.03 µm, or 0.05 µm, or 0.1 µm, or 0.5 µm, or 1.0 µm to 5 µm, or 10 µm, or 15 µm, or 20 µm; (5) and/or an epoxy content from 0.50%, or 0.75% to 1.5%, or 2.0%, based on total molecular weight of the MSLPP the aqueous composition contains from 1 wt %, or 5 wt %, or 10 wt %, or 15 wt %, or 20 wt %, or 25 wt %, or 30 wt %, or 35 wt %, or 40 wt %, or 45 wt %, to 50 wt %, or 55 wt %, or 60 wt %, or 70 wt %, or 80 wt % MSLPP, based on the total weight of the aqueous composition;

the aqueous composition is void of, or substantially void of, formaldehyde; and the aqueous composition is void of, or substantially void of, an external crosslinking agent.

It is understood that the sum of the components in each of the MSLPP disclosed herein, including the foregoing MSLPP, yields 100 wt %.

It is understood that the sum of the components in each of the aqueous compositions disclosed herein, including the foregoing aqueous composition, yields 100 wt %.

The aqueous composition may comprise two or more embodiments disclosed herein.

E. Article

In an embodiment, an article can be prepared that includes a textile and the above-described aqueous composition. The textile is impregnated or coated with the aqueous composition.

In an embodiment, an article can be prepared that includes a non-woven textile and the above-described aqueous composition. The nonwoven textile is impregnated with the aqueous composition.

In an embodiment, an article is provided that includes a nonwoven textile impregnated with a coating. The coating includes a composition including MSLPP that include (A) a first-stage polymer containing (i) COOH-EUAM and (ii) a first vinyl monomer; and (B) a second-stage polymer containing (i) Epoxy-EUM and (ii) a second vinyl monomer.

The article includes a textile. A nonlimiting example of a suitable textile is a nonwoven textile.

In an embodiment, the article includes a nonwoven textile. A nonlimiting example of a nonwoven textile is a knitted textile. Nonlimiting examples of artificial fibers include polyesters, polyamides, acrylics, polyolefins, polyvinyl chlorides, polyvinylidene chlorides, polyvinyl alcohols, and combinations thereof. Nonlimiting examples of suitable natural fibers include wool, cellulosic, and combinations thereof. Nonlimiting examples of cellulosic fibers include cotton, hemp, and combinations thereof. In an embodiment, the fibers are selected from artificial fibers, cellulosic fibers, and combinations thereof.

In an embodiment, the nonwoven textile is impregnated with the coating. A nonwoven textile "impregnated" with coating includes coating distributed throughout, or substantially throughout the textile such that the coating contacts the fibers throughout the thickness of the nonwoven textile. In other words, the coating is distributed between two opposing surfaces of the nonwoven textile. The nonwoven textile that is impregnated with a coating is structurally distinct from nonwoven textiles having a coating layer extending along a single surface of the nonwoven textile.

In an embodiment, the coating directly contacts the nonwoven textile, or further, the fibers of the nonwoven textile. The term "directly contacts," as used herein, is a coating configuration whereby the coating is located immediately adjacent to the nonwoven textile (or further, the fibers), the coating touches the nonwoven textile (or further, the fibers), and no intervening layers, no intervening coatings, and/or no intervening structures, are present between the coating and the textile (or further, the fibers).

In another embodiment, the coating indirectly contacts the nonwoven textile, or further, the fibers of the nonwoven textile. The term "indirectly contacts," as used herein, is a coating configuration whereby an intervening layer, an intervening coating, and/or an intervening structure, is present between the coating and the textile (or further, the fibers).

In an embodiment, the article contains from 1 wt %, or 5 wt %, or 10 wt %, or 15 wt % to 17 wt %, or 20 wt %, or 25 wt % MSLPP, based on the total weight of the article.

In an embodiment, the article has a dry tensile strength from 5.0 kgf/in, or 5.5 kgf/in, or 5.7 kgf/in, or 5.8 kgf/in, or 6.0 kgf/in, or 6.2 kgf/in to 6.8 kgf/in, or 7.0 kgf/in, or 8.0 kgf/in, or 10.0 kgf/in, or 15.0 kgf/in, or 20.0 kgf/in.

In an embodiment, the article has a wet tensile force from 2.6 kgf/in, or 2.7 kgf/in, or 2.8 kgf/in, or 2.9 kgf/in, or 3.0 kgf/in to 3.3 kgf/in, or 3.5 kgf/in, or 4.0 kgf/in, or 5.0 kgf/in, or 10.0 kgf/in, or 15.0 kgf/in.

In an embodiment, the article has a wet tensile retention from 44%, or 45% to 57%, or 60%, or 65%, or 70%, or 75%, or 80%, or 85%, or 90%, or 95%, or 100%. In another embodiment, the article has a wet tensile retention from 44% to 100%, or from 44% to 80%, or from 44% to 60%. A wet tensile retention from 44% to 100% indicates that the coating sufficiently binds the fibers of the nonwoven textile to each other for article applications that are conventionally exposed to water, such as clothing that should be washable. Without sufficient wet tensile retention, the article will fray or break apart after being exposed to water.

In an embodiment, the article has an isopropyl alcohol (IPA) tensile force from 3.0 kgf/in, or 3.1 kgf/in to 3.6 kgf/in, or 4.0 kgf/in, or 4.5 kgf/in, or 5.0 kgf/n, or 5.5 kgf/in, or 6.0 kgf/in, or 10.0 kgf/in.

In an embodiment, the article has an IPA tensile retention from 40%, or 45%, or 50% to 63%, or 65%, or 70%, or 75%, or 80%, or 85%, or 90%, or 95%, or 100%. In a further embodiment, the article has an IPA tensile retention from 40% to 100%, or from 45% to 80%, or from 50% to 80%, or from 50% to 65%. Articles with an IPA tensile retention of 40% to 100% indicates that the coating sufficiently binds the fibers of the nonwoven textile to each other for article applications that are conventionally exposed to solvents, such as clothing that should be washable. Without sufficient IPA tensile retention, the article will fray or break apart after being exposed to the solvent.

In an embodiment, the article has (i) a wet tensile retention from 44%, or 45% to 57%, or 60%, or 65%, or 70%, or 75%, or 80%, or 85%, or 90%, or 95%, or 100% and (ii) an IPA tensile retention from 40%, or 45%, or 50% to 63%, or 65%, or 70%, or 75%, or 80%, or 85%, or 90%, or 95%, or 100%.

In an embodiment, the article includes a nonwoven textile impregnated with a coating. The coating includes a composition including MSLPP containing, consisting essentially of, or consisting of:
(A) from 50 wt %, or 55 wt %, or 60 wt %, or 65 wt %, or 70 wt %, or 75 wt %, or 80 wt %, or 85 wt %, or 90 wt % to 95 wt %, or 99 wt % first-stage polymer, based on the total weight of the MSLPP, the first-stage polymer containing (i) from 1.0 wt %, or 1.5 wt %, or 2.0 wt %, or 2.5 wt % to 5.0 wt %, or 5.5 wt %, or 6.0 wt %, or 7.0 wt %, or 8.0 wt %, or 9.0 wt %, or 10.0 wt % % polymerized units of COOH-EUAM, based on the dry weight of the first-stage polymer; and (ii) from 90 wt %, 91 wt %, or 92 wt %, or 93 wt %, or 94 wt %, or 95 wt % to 97.5 wt %, or 98 wt %, or 98.5 wt %, 99 wt % polymerized units of a first vinyl monomer, based on the dry weight of the first-stage polymer;
(B) from 1 wt %, or 2 wt %, or 5 wt % to 10 wt %, or 15 wt %, or 20 wt %, or 25 wt %, or 30 wt %, or 35 wt %, or 40 wt %, or 45 wt %, or 50 wt % second-stage polymer, based on the total weight of the MSLPP, the second-stage polymer containing (i) from 25 wt %, or 30 wt %, or 35 wt %, or 40 wt %, or 45 wt % to 50 wt %, or 55 wt %, or 60 wt %, or 65 wt %, or 70 wt %, or 75 wt % polymerized units of Epoxy-EUM, based on the dry weight of the second-stage polymer; (ii) from 25 wt %, or 30 wt %, or 35 wt %, or 40 wt %, or 45 wt % to 50 wt %, or 55 wt %, or 60 wt %, or 65 wt %, or 70 wt %, or 75 wt % polymerized units of second vinyl monomer, based on the dry weight of the second-stage polymer; and (iii) from greater than 0 wt %, or 0.01 wt %, or 0.05 wt %, or 0.1 wt %, or 0.2 wt %, or 0.3 wt %, or 0.4 wt %, or 0.5 wt % to 0.6 wt %, or 0.7 wt %, or 0.8 wt %, or 0.9 wt %, or 1.0 wt %, or 5.0 wt % additive, based on the dry weight of the second-stage polymer;
the second-stage polymer has a Mw from 10,000 g/mol, or 12,000 g/mol, or 15,000 g/mol, or 17,000 g/mol, or 20,000 g/mol to 100,000 g/mol, or 150,000 g/mol, or 200,000 g/mol, or 250,000 g/mol, or 300,000 g/mol, or 350,000 g/mol, or 400,000 g/mol, or 500,000 g/mol;
the first-stage polymer is bound to the second-stage polymer; and
the MSLPP has one, some, or all, of the following properties: (1) the first-stage polymer is void of, or substantially void of, Epoxy-EUM; and/or (2) the second-stage polymer is void of, or substantially void of, COOH-EUAM; and/or (3) the weight ratio of the first-stage polymer to the second-stage polymer in the MSLPP is from 1:1, or 4:1, or 5:1, or 9:1 to 19:1, or 20:1, or 50:1, or 75:1, or 99:1; and/or (4) the MSLPP has a $D_{50}$ particle size from 0.03 µm, or 0.05 µm, or 0.1 µm, or 0.5 µm, or 1.0 µm to 5 µm, or 10 µm, or 15 µm, or 20 µm; and/or (5) an epoxy content from 0.50%, or 0.75% to 1.5%, or 2.0%, based on total molecular weight of the MSLPP;
wherein the composition is formed from an aqueous composition containing from 1 wt %, or 5 wt %, or 10 wt %, or 15 wt %, or 20 wt %, or 25 wt %, or 30 wt %, or 35 wt %, or 40 wt %, or 45 wt %, to 50 wt %, or 55 wt %, or 60 wt %, or 70 wt %, or 80 wt % MSLPP, based on the total weight of the aqueous composition;
the aqueous composition is void of, or substantially void of, formaldehyde;
the aqueous composition is void of, or substantially void of, an external crosslinking agent;
the article has one, some, or all, of the following properties: (1) a dry tensile strength from 5.0 kgf/in, or 5.5 kgf/in, or 5.7 kgf/in, or 5.8 kgf/in, or 6.0 kgf/in, or 6.2 kgf/in to 6.8 kgf/in, or 7.0 kgf/in, or 8.0 kgf/in, or 10.0 kgf/in, or 15.0 kgf/in, or 20.0 kgf/in; and/or (2) a wet tensile force from 2.6 kgf/in, or 2.7 kgf/in, or 2.8 kgf/in, or 2.9 kgf/in, or 3.0 kgf/in to 3.3 kgf/in, or 3.5 kgf/in, or 4.0 kgf/in, or 5.0 kgf/in, or 10.0 kgf/in, or 15.0 kgf/in; and/or (3) a wet tensile retention from 44%, or 45% to 57%, or 60%, or 65%, or 70%, or 75%, or 80%, or 85%, or 90%, or 95%, or 100%; and/or (4) an IPA tensile force from 3.0 kgf/in, or 3.1 kgf/in to 3.6 kgf/in, or 4.0 kgf/in, or 4.5 kgf/in, or 5.0 kgf/in, or 5.5 kgf/in, or 6.0 kgf/in, or 10.0 kgf/in; and/or (5) an IPA tensile retention from 40%, or 45%, or 50% to 63%, or 65%, or 70%, or 75%, or 80%, or 85%, or 90%, or 95%, or 100%.

An article, such as those described above, can typically be made by contacting and impregnating the nonwoven textile with the aqueous composition, and then evaporating the water, by exposure to moving air, by exposure to a temperature above 25° C., or a combination thereof. Nonlimiting methods of contacting the nonwoven textile with the present aqueous composition include immersing, dipping, pouring, and combinations thereof. Bounded by no particular theory, it is believed that during or after evaporation of the water, latent crosslinking groups on the MSLPP will undergo chemical reactions with each other to form covalent bonds between the MSLPP. It is believed that the bonds formed by the latent crosslinking groups will connect the first-stage polymer to the second-stage polymer, and will also connect polymer chains residing in different MSLPPs.

In an embodiment, the aqueous composition is brought into contact with a nonwoven textile, such as in the form of a flat mat, in which the fibers may or may not be bonded to each other prior to contact and impregnation with the aqueous composition. The water is evaporated, or substantially evaporated, from the aqueous composition to form a coating that is in contact with the nonwoven textile, the nonwoven textile impregnated with the coating.

In an embodiment, the coating is crosslinked. In an embodiment, the article is crosslinked via exposure to a temperature from 100° C., or 125° C., or 150° C. to 175° C., or 200° C., or 250° C. for a period from 1 minute (min), or 2 min, or 3 min to 5 min, or 10 min, or 15 min, or 20 min, or 30 min, or 60 min.

Nonlimiting examples of suitable articles include clothing, towels, bedding, blankets, signs, wipes, filters, shoes, bags, toys, flags, furnishings, curtains, carpet, carpet backing, wall coverings, automotive applications (e.g., head liners, hood liners, flooring, upholstery), and combinations thereof.

The article may comprise two or more embodiments disclosed herein.

Byway of example, and not limitation, some embodiments of the present disclosure will now be described in detail in the following Examples.

EXAMPLES

Materials used in the examples are provided in Table 1 below.

TABLE 1

| Material | Properties | Source |
| --- | --- | --- |
| RHODACAL ™ DS-4 | sodium dodecyl benzene sulfonate (SDBS) surfactant; solids content = 23 wt % | Rhodia |
| D.E.R. ™ 736 | polypropylene glycol modified epoxy liquid reaction product of Epichlorohydrin and dipropylene glycol epoxy content = 21.0-24.6% | Olin Corporation |
| methyl mercaptopropionate (MMP) | 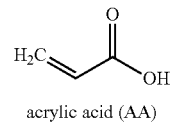 | Tokyo Chemical Industry Co., Ltd. |
| BRUGGOLITE ™ FF6 M (FF6) | Sodium salt of an organic sulfinic acid derivative reducing agent | BrüggemannChemical |

The monomers used in the examples are provided in Table 2 below.

TABLE 2

Monomers

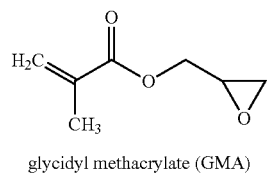

styrene (STY)

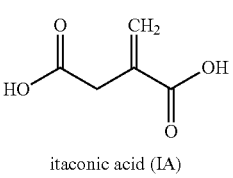

butyl acrylate (BA)

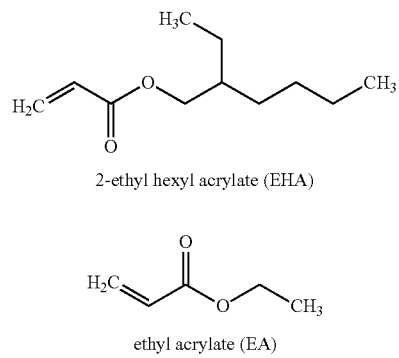

hydroxy ethyl methacrylate (HEMA)

TABLE 2-continued

Monomers 2-ethyl hexyl acrylate (EHA)

ethyl acrylate (EA)

TABLE 2-continued

Monomers acrylic acid (AA)

glycidyl methacrylate (GMA)

itaconic acid (IA)

TABLE 2-continued

Monomers

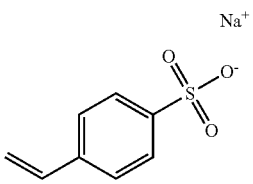

sodium styrene sulfonate (SSS) (ionic monomer)

A. Example 1 (Ex 1)—Aqueous Composition Containing MSLPP

A first monomer emulsion (ME 1) for Example 1 is prepared in a first flask by dissolving 5.73 g RHODACAL™ DS-4 in 475 g deionized (DI) water. Then, an emulsified monomer mixture is formed by slowly adding the following components to the first flask, while agitating the first flask: 6.84 g IA; 34.2 g AA; 1107.4 g BA; and 191.4 g STY.

A second monomer emulsion (ME 2) for Example 1 is prepared in a second flask by dissolving 0.71 g RHODACAL™ DS-4 in 20 g DI water. Then, an emulsified monomer mixture is formed by slowly adding the following components to the second flask, while agitating the second flask: 3.4 g AA; 30.8 g BA; and 34.2 g GMA.

A first initiator emulsion (IE 1) is prepared in a separate vial by combining 15 g DI water and 3.72 g ammonia persulfate (APS). The IE 1 is emulsified for 5 min with a homogenizer at 5,000 rpm.

A second initiator emulsion (IE 2) is prepared in a separate vial by combining 52 g DI water and 2.48 g APS. The IE 2 is emulsified for 5 min with a homogenizer at 5,000 rpm.

A solution containing 50.08 g RHODACAL™ DS-4 dissolved in 370 g DI water is placed in a 5-necked, 3-liter round bottom flask (a Kettle) equipped with a thermocouple, a cooling condenser, and an agitator. The solution is heated to 60° C. under nitrogen. The Kettle is then charged with 82.8 g of ME 1, the IE 1, and 1.86 g sodium bisulfite (NaBS). After the exotherm peak is reached and the temperature of the Kettle is 60° C., the remaining ME 1, the IE 2, and a solution of 1.24 g NaBS dissolved in 48 g DI water is fed into the Kettle over a period of 120 minutes while maintaining a temperature of 59-61° C. Then, the first flask and the feeding pipes leading into the Kettle are rinsed with 90 g DI water, and the rinse is added to the Kettle. The Kettle is held at 60° C. for a period of 15 minutes. The first-stage polymer is formed.

Then, ME 2 is charged into the Kettle, followed by (i) a solution containing 1.05 g tert-butyl hydroperoxide (t-BHP) in 10 g DI water; and (ii) a solution containing 0.9 g FF6 in 10 g DI water. The Kettle is held for 15 minutes at a temperature of 60° C., after which time (i) a solution containing 3.98 g t-BHP in 40 g DI water; and (ii) a solution containing 3.38 g FF6 in 40 g DI water are gradually added to the Kettle over a period of 60 minutes (while the Kettle is held at a temperature of 60° C.). The second-stage polymer is formed.

The Kettle is cooled to room temperature (23° C.). Then, a solution of 39 g ammonia in 78 g DI water is added to the Kettle to adjust the pH value of the aqueous composition to 6.5-7.5.

B. Example 2 (Ex 2)—Aqueous Composition Containing MSLPP

Example 2 is prepared using the above-described procedure for preparing Example 1, except that 0.34 g MMP (a chain transfer agent) is included in ME 2. The MMP controls the Mw of the second-stage polymer, resulting in Example 2 having a second-stage polymer with a Mw of 20,000 g/mol.

C. Comparative Sample 3 (CS 3)

Comparative Sample 3 is prepared using the above-described procedure for preparing Example 1, except that ME 2 is not charged into the Kettle. Thus, CS 3 includes single-stage polymer particles. The solids content of the CS 3 aqueous composition is adjusted with DI water to 45 wt %, based on the total weight of the aqueous composition.

D. Comparative Sample 4 (CS 4)

Comparative Sample 4 is prepared by blending 100 g of CS 3 with 1.6 g D.E.R. 736 (a polypropylene glycol modified epoxy). Thus, CS 4 includes single-stage polymer particles. The epoxy group-containing monomer of CS 4 is from the D.E.R. 736, and is not bound to the polymeric backbone of the first-stage polymer.

E. Comparative Sample 5 (CS 5)

Comparative Sample 5 is prepared using the above-described procedure for preparing Example 1, except that all of the IA is replaced with AA.

F. Example 6 (Ex 6)—Aqueous Composition Containing MSLPP

Example 6 is prepared using the above-described procedure for preparing Example 1, except that the first monomer emulsion (ME 1) and the second monomer emulsion (ME 2) contain different monomers, and the amount of ME2 is increased from 5 wt % to 10 wt %.

Specifically, a first monomer emulsion (ME 1) for Example 6 is prepared in a first flask by dissolving 5.73 g RHODACAL™ DS-4 in 475 g deionized (DI) water. Then, an emulsified monomer mixture is formed by slowly adding the following components to the first flask, while agitating the first flask: 817.5 g BA; 380.2 g EA; 63.4 g IA; and 6.3 g HEMA.

A second monomer emulsion (ME 2) for Example 6 is prepared in a second flask by dissolving 0.71 g RHODACAL™ DS-4 in 20 g DI water. Then, an emulsified monomer mixture is formed by slowly adding the following components to the second flask, while agitating the second flask: 70.4 g STY; 69.7 g GMA; and 0.7 g SSS (ionic monomer).

G. Comparative Sample 7 (CS 7)

Comparative Sample 7 is prepared using the above-described procedure for preparing Example 6, except that ME 2 is not charged into the Kettle. Thus, CS 7 includes single-stage polymer particles.

H. Example 8 (Ex 8)—Aqueous Composition Containing MSLPP

Example 8 is prepared using the above-described procedure for preparing Example 1, except that the first monomer emulsion (ME 1) and the second monomer emulsion (ME 2) contain different monomers, and the amount of ME2 is increased from 5 wt % to 10 wt %.

Specifically, a first monomer emulsion (ME 1) for Example 8 is prepared in a first flask by dissolving 5.73 g RHODACAL™ DS-4 in 475 g deionized (DI) water. Then, an emulsified monomer mixture is formed by slowly adding the following components to the first flask, while agitating the first flask: 950.6 g EA; 253.5 g EHA; and 63.4 g IA.

A second monomer emulsion (ME 2) for Example 8 is prepared in a second flask by dissolving 0.71 g RHODACAL™ DS-4 in 20 g DI water. Then, an emulsified monomer mixture is formed by slowly adding the following components to the second flask, while agitating the second flask: 70.4 g EHA; 69.7 g GMA; and 0.7 g SSS (ionic monomer).

I. Comparative Sample 9 (CS 9)

Comparative Sample 9 is prepared using the above-described procedure for preparing Example 8, except that ME 2 is not charged into the Kettle. Thus, CS 9 includes single-stage polymer particles.

Each aqueous composition Example and Comparative Sample has a solids content of 45 wt %, based on the total weight of the respective aqueous composition, The composition and properties of the aqueous composition Examples and Comparative Samples are provided below in Table 3.

J. Articles

Each Example and Comparative Sample is diluted with deionized (DI) water to have a solids content of 12 wt %, based on the total weight of the aqueous composition.

A substrate is provided that is a piece of WHATMAN™ Grade 4 cellulose filter paper (available from Whatman Ltd.) that is 28 cm×46 cm.

The substrate is (i) immersed in 300 mL of the diluted sample for a period of 30 seconds, (ii) removed from the diluted sample, and (iii) padded by a Mathis™ padder to form an article. The substrate is impregnated with the aqueous composition, such that the aqueous composition containing the polymer particles is substantially evenly distributed throughout the thickness of the substrate.

The article is then dried and crosslinked in an oven at a temperature of 150° C. for 3 minutes to form a crosslinked article. The add-on of the polymer particles is controlled to be from 15 wt % to 17 wt % of the total crosslinked article.

The dry tensile strength, wet tensile strength, and IPA tensile strength of the Example and Comparative Sample articles are measured, and are provided below in Table 3.

TABLE 3

| | First-Stage Polymer[1] | Second-Stage Polymer[1] | wt % 1st Stage Polymer[2] | wt % 2nd Stage Polymer[2] | 2nd Stage Polymer Mw (g/mol) | Epoxy % BOTM[4] | Dry Tensile Strength (kgf/in) | Wet Tensile Strength (kgf/in) | Wet Tensile Retention (%) | IPA Tensile Strength (kgf/in) | IPA Tensile Retention (%) |
|---|---|---|---|---|---|---|---|---|---|---|---|
| Ex 1 | 81.0 wt % BA 14.0 wt % STY 2.5 wt % IA 2.5 wt % AA | 45.0 wt % BA 50.0 wt % GMA 5.0 wt % AA | 95 | 5 | 200,000 | 0.75 | 6.76 | 3.03 | 44.8 | 3.42 | 50.6 |
| Ex 2[5] | 81.0 wt % BA 14.0 wt % STY 2.5 wt % IA 2.5 wt % AA | 45.0 wt % BA 50.0 wt % GMA 5.0 wt % AA | 95 | 5 | 20,000 | 0.75 | 6.21 | 2.84 | 45.7 | 3.25 | 52.3 |
| CS 3 | 81.0 wt % BA 14.0 wt % STY 2.5 wt % IA 2.5 wt % AA | — | 100 | — | — | 0 | 6.41 | 2.84 | 44.3 | 1.43 | 22.3 |
| CS 4[3] | 81.0 wt % BA 14.0 wt % STY 2.5 wt % IA 2.5 wt % AA | — | 100 | — | — | 0.75 | 6.41 | 3.07 | 47.9 | 1.89 | 29.5 |
| CS 5 | 81.0 wt % BA 14.0 wt % STY 5.0 wt % AA | 45.0 wt % BA 50.0 wt % GMA 5.0 wt % AA | 95 | 5 | NM | 0.75 | 6.26 | 2.33 | 37.2 | 2.24 | 35.8 |
| Ex 6 | 64.5 wt % BA 30.0 wt % EA 5.0 wt % IA 0.5 wt % HEMA | 50.0 wt % STY 49.5 wt % GMA 0.5 wt % SSS | 90 | 10 | NM | 1.5 | 5.7 | 2.9 | 50.9 | 3.1 | 54.4 |
| CS 7 | 64.5 wt % BA 30.0 wt % EA 5.0 wt % IA 0.5 wt % HEMA | — | 100 | — | — | 0 | 5.4 | 2.5 | 46.3 | 2.0 | 37.0 |
| Ex 8 | 75.0 wt % EA 20.0 wt % EHA 5.0 wt % IA | 50.0 wt % EHA 49.5 wt % GMA 0.5 wt % SSS | 90 | 10 | NM | 1.5 | 5.8 | 3.3 | 56.9 | 3.6 | 62.1 |
| CS 9 | 75.0 wt % EA 20.0 wt % EHA 5.0 wt % IA | — | 100 | — | — | 0 | 5.7 | 2.5 | 43.9 | 2.0 | 35.1 |

[1]Based on the total weight of the respective first-stage polymer and second-stage polymer.
[2]Based on the total weight of the respective single-stage polymer particle or MSLPP.
[3]CS 4 is a blend of 100 g of the single-stage polymer CS 3 and 1.6 pph D.E.R. 736.
[4]BOTM = based on total molecular weight (of the respective single-stage polymer particle or MSLPP).
[5]Ex 2 second-stage polymer further contains 0.5 wt % MMP, based on the total weight of the monomers used to form the second-stage polymer.
NM = not measured CS 3, CS 4, CS 7, and CS 9 each is an aqueous composition with single-stage polymer particles containing a ethylenically unsaturated acid monomer with two carboxylic acid groups (COOH-EUAM) (IA) and at least one vinyl monomer (BA, STY, AA, EA, EHA, and/or HEMA). Crosslinked articles impregnated with CS 3, CS 4, CS 7, and CS 9 each exhibits (i) an IPA tensile strength of less than 3.0 kgf/in and (ii) an IPA tensile retention of less than 40%. Articles with an IPA tensile retention of less than 40% are not suitable for article applications that are conventionally exposed to solvents, such as clothing that should be washable, because the article will fray or break apart after being exposed to the solvent.

CS 5 is an aqueous composition containing particles with (A) a first-stage polymer containing three vinyl monomers (BA, STY, and AA), but lacking a COOH-EUAM; and (B) a second-stage polymer containing an ethylenically unsaturated monomer with an epoxy group (Epoxy-EUM) (GMA) and two vinyl monomers (BA and AA). The AA monomer is an ethylenically unsaturated acid monomer having a single carboxylic acid group. Crosslinked articles impregnated with CS 5 exhibit (i) an IPA tensile strength of less than 3.0 kgf/in (2.24 kgf/in) and (ii) an IPA tensile retention of less than 40% (35.8%), as shown in Table 3. Articles with an IPA tensile retention of less than 40% are not suitable for article applications that are conventionally exposed to solvents, such as clothing that should be washable, because the article will fray or break apart after being exposed to the solvent.

Applicant unexpectedly found that crosslinked articles impregnated with aqueous compositions containing MSLPP with (A) a first-stage polymer containing a COOH-EUAM (IA) and at least one vinyl monomer; and (B) a second-stage polymer containing an Epoxy-EUM (GMA) and at least one vinyl monomer (Examples 1, 2, 6 and 8) advantageously exhibit (i) a suitable IPA tensile strength of greater than 3.0 kgf/in and (ii) a suitable IPA tensile retention of greater than 40%, as shown in Table 3. Consequently, crosslinked articles impregnated with a coating formed from Examples 1, 2, 6 or 8 are suitable for article applications that are conventionally exposed to solvents, such as clothing that should be washable.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. An aqueous composition comprising multi-stage latex polymer particles comprising:
   (A) a first-stage polymer consisting of
      (i) an ethylenically unsaturated acid monomer comprising two carboxylic acid groups;
      (ii) at least two first vinyl monomers selected from the group consisting of butyl acrylate, ethyl acrylate, styrene, hydroxy ethyl methacrylate, 2-ethylhexyl acrylate, and acrylic acid;
   (B) a second-stage polymer bound to the first stage polymer and comprising
      (i) an ethylenically unsaturated monomer comprising an epoxy group; and
      (ii) a second vinyl monomer different than the monomer of (B)(i).

2. The aqueous composition of claim 1, wherein the second-stage polymer has a Mw from 10,000 g/mol to 400,000 g/mol.

3. The aqueous composition of claim 1, wherein the first-stage polymer comprises from 1.0 wt %, to 10.0 wt % polymerized units of the ethylenically unsaturated acid monomer comprising two carboxylic acid groups, based on the dry weight of the first-stage polymer.

4. The aqueous composition of claim 1, wherein the multi-stage latex polymer particles have an epoxy content from 0.50% to 5.0%, based on total molecular weight of the multi-stage latex polymer particles.

5. The aqueous composition of claim 1, wherein the ethylenically unsaturated acid monomer comprising two carboxylic acid groups is itaconic acid.

6. The aqueous composition of claim 1, wherein the ethylenically unsaturated monomer comprising an epoxy group is glycidyl methacrylate.

7. The aqueous composition of claim 1, wherein the the second vinyl monomer is selected from the group consisting of butyl acrylate, styrene, 2-ethyl hexyl acrylate, acrylic acid, sodium styrene sulfonate, and combinations thereof.

8. An article comprising a nonwoven textile impregnated with the aqueous composition of claim 1.

9. An article comprising:
   a nonwoven textile impregnated with a coating;
   the coating comprising a aqueous composition comprising multi-stage latex polymer particles comprising:
   (A) a first-stage polymer consisting of
      (i) an ethylenically unsaturated acid monomer comprising two carboxylic acid groups;
      (ii) a at least two first vinyl monomers selected from the group consisting of butyl acrylate, ethyl acrylate, styrene, hydroxy ethyl methacrylate, 2-ethylhexyl acrylate, and acrylic acid;
   (B) a second-stage polymer and bound to the first-stage polymer and comprising
      (i) an ethylenically unsaturated monomer comprising an epoxy group; and
      (ii) a second vinyl monomer different than the monomer of (B)(i).

10. The article of claim 9, wherein the coating is crosslinked; and
    the article has an IPA Tensile Retention from 40% to 100%.

11. An aqueous composition comprising multi-stage latex polymer particles comprising:
    (A) a first-stage polymer comprising
       (i) an ethylenically unsaturated acid monomer comprising two carboxylic acid groups;
       (ii) a first vinyl monomer different than the monomer (A)(i),
    (B) a second-stage polymer bound to the first-stage polymer and consisting of
       (i) an ethylenically unsaturated monomer comprising an epoxy group; and
       (ii a second vinyl monomer selected from the group consisting of acrylic acid, butyl acrylate, styrene, sodium styrene sulfonate, 2-ethyl hexyl acrylate, and combinations thereof.

12. The aqueous composition of claim 11 wherein the first vinyl monomer is selected from the group consisting of butyl acrylate, ethyl acrylate, styrene, hydroxy ethyl methacrylate, 2-ethylhexyl acrylate, acrylic acid, and combinations thereof.

* * * * *